(12) United States Patent
Nagata et al.

(10) Patent No.: US 10,559,809 B2
(45) Date of Patent: Feb. 11, 2020

(54) POWER STORAGE DEVICE

(71) Applicant: SHOWA DENKO PACKAGING CO., LTD., Kanagawa (JP)

(72) Inventors: Kensuke Nagata, Kanagawa (JP); Koji Minamitani, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 12 days.

(21) Appl. No.: 15/764,979

(22) PCT Filed: Sep. 8, 2016

(86) PCT No.: PCT/JP2016/076471
§ 371 (c)(1),
(2) Date: Mar. 30, 2018

(87) PCT Pub. No.: WO2017/056906
PCT Pub. Date: Apr. 6, 2017

(65) Prior Publication Data
US 2018/0294473 A1   Oct. 11, 2018

(30) Foreign Application Priority Data
Oct. 2, 2015 (JP) ................................ 2015-196965

(51) Int. Cl.
*H01M 2/34* (2006.01)
*H01M 2/30* (2006.01)
(Continued)

(52) U.S. Cl.
CPC ............ *H01M 2/348* (2013.01); *H01G 11/24* (2013.01); *H01G 11/26* (2013.01); *H01G 11/30* (2013.01);
(Continued)

(58) Field of Classification Search
None
See application file for complete search history.

(56) References Cited

FOREIGN PATENT DOCUMENTS

| JP | 10-302756 A | 11/1998 |
|----|----|----|
| JP | 2001-57184 A | 2/2001 |

(Continued)

OTHER PUBLICATIONS

Machine Translation of JP 2003-282033 (Year: 2003).*
(Continued)

*Primary Examiner* — Wyatt P McConnell
(74) *Attorney, Agent, or Firm* — Millen, White, Zelano & Branigan, P.C.; William Nixon

(57) ABSTRACT

A first packaging material, a second packaging material, an electrode body having a positive electrode, a negative electrode, and a separator are provided. A packaging member is formed having an electrode body chamber. A first inner conducting portion allows conduction to a first metal foil and a second inner conducting portion allows conduction to a second metal foil. In the electrode body chamber, electrode body is conducted to a first inner conducting portion in the positive electrode and the electrode body is conducted to a second inner conducting portion in the negative electrode. At least one of the pair of the first metal foil and the positive electrode current collector of the positive electrode and the pair of the second metal foil and the negative electrode current collector of the negative electrode is made of the same metal.

8 Claims, 2 Drawing Sheets

(51) Int. Cl.
  H01G 11/78    (2013.01)
  H01M 2/02     (2006.01)
  H01M 10/04    (2006.01)
  H01G 11/82    (2013.01)
  H01G 11/80    (2013.01)
  H01G 11/76    (2013.01)
  H01G 11/26    (2013.01)
  H01G 11/24    (2013.01)
  H01G 11/30    (2013.01)
  H01G 11/68    (2013.01)
  H01M 4/13     (2010.01)
  H01M 4/66     (2006.01)
  H01M 10/0585  (2010.01)
  H01G 11/28    (2013.01)
  H01M 10/0525  (2010.01)

(52) U.S. Cl.
  CPC ............ *H01G 11/68* (2013.01); *H01G 11/76* (2013.01); *H01G 11/78* (2013.01); *H01G 11/80* (2013.01); *H01G 11/82* (2013.01); *H01M 2/024* (2013.01); *H01M 2/0215* (2013.01); *H01M 2/0262* (2013.01); *H01M 2/0272* (2013.01); *H01M 2/0277* (2013.01); *H01M 2/0285* (2013.01); *H01M 2/0287* (2013.01); *H01M 2/30* (2013.01); *H01M 4/13* (2013.01); *H01M 4/662* (2013.01); *H01M 10/0413* (2013.01); *H01M 10/0585* (2013.01); *H01G 11/28* (2013.01); *H01M 10/0525* (2013.01); *H01M 2200/103* (2013.01); *H01M 2220/20* (2013.01); *Y02E 60/13* (2013.01)

(56) References Cited

FOREIGN PATENT DOCUMENTS

| | | |
|---|---|---|
| JP | 2003-282033 A | 10/2003 |
| JP | 2005-276486 A | 10/2005 |
| JP | 2007-66806 A | 3/2007 |
| JP | 2014-44920 A | 3/2014 |
| KR | 10-0528902 B1 | 11/2005 |

OTHER PUBLICATIONS

Machine Translation of JP 2005-276486 (Year: 2005).*
Korean Office Action dated Jan. 18, 2019 issued in corresponding KR 10-2018-7008052 application (5 pages).
English Abstract of KR 20000066403 A which corresponds to KR 10-0528902 B1 published Nov. 15, 2000.
International Search Report dated Nov. 8, 2016 issued in corresponding PCT/JP2016/076471 application (2 pages).

* cited by examiner

POWER STORAGE DEVICE

FIELD OF THE INVENTION

The present invention relates to a power storage device packaged with a laminate material, which is used as a lithium ion battery, an electric double layer capacitor, an all-solid battery, or the like.

BACKGROUND ART

In a battery for use in a hybrid vehicle and an electric vehicle, a lithium-ion secondary battery or a lithium polymer secondary battery for use in a stationary storage battery for household use or for industrial use, in accordance with miniaturization or weight reduction thereof, in place of a conventionally used metallic packaging member, the use of a lamination packaging material in which a resin film is laminated on both surfaces of a metal foil is increasing. It also has been considered to install an electric double layer capacitor, a lithium-ion capacitor, etc., using a laminate packaging material on an automobile and a bus (see Patent Documents 1 and 2).

In a current power storage device, as described in Patent Documents 1 and 2, in a state in which a tab lead is connected to an electrode body and the tip of the tab lead is pulled out to outside the electrode body, packaging materials are heat-sealed, so that the electrode body is sealed inside the packaging member.

PRIOR ART

Patent Document

Patent Document 1: Japanese Unexamined Patent Application Publication No. 10-302756
Patent Document 2: Japanese Unexamined Patent Application Publication No. 2001-57184

SUMMARY OF THE INVENTION

Problems to be Solved by the Invention

A currently available power storage device has such a structural problem that a pulled out portion of a tab lead is inferior in sealing property as compared with a portion where the laminate packaging members are directly joined and a resistance value is increased due to a connection between an electrode body and the tab lead.

Means for Solving the Problems

In view of the aforementioned background art, it is an object of the present invention to provide a power storage device excellent in sealing property and suppressed in resistance value.

That is, the present invention has the following configurations [1] to [3].

[1] A power storage device comprising:
a first packaging material in which a first heat resistant resin layer is adhered to one surface of a first metal foil and a first heat fusible resin layer is adhered to the other surface of the first metal foil, wherein the first packaging material is provided with a first inner conducting portion allowing conduction to the first metal foil on a surface of the first heat fusible resin layer side;

a second packaging material in which a second heat resistant resin layer is adhered to one surface of a second metal foil and a second heat fusible resin layer is adhered to the other surface of the second metal foil, wherein the second packaging material is provided with a second inner conducting portion allowing conduction to the second metal foil on a surface of the second heat fusible resin layer side, and an electrode body including a positive electrode in which a positive electrode active material is coated on a positive electrode current collector, a negative electrode in which a negative electrode active material is coated on a negative electrode current collector, and a separator disposed between the positive electrode and the negative electrode, wherein a packaging member having an electrode body chamber in which the first inner conducting portion and the second inner conducting portion face in the chamber is formed such that the first heat fusible resin layer of the first packaging material and the second heat fusible resin layer of the second packaging material face each other and the chamber is surrounded by a heat-sealed portion in which the first heat fusible resin layer and the second heat fusible resin layer are fusion-bonded, the positive electrode of the electrode body sealed in the electrode body chamber together with an electrolyte is conducted to the first inner conducting portion, and the negative electrode thereof is conducted to the second inner conducting portion, at least one of a pair of the first metal foil and the positive electrode current collector and a pair of the second metal foil and the negative electrode current collector is made of the same kind of metal, and a first outer conducting portion allowing conduction to the first metal foil and a second outer conducting portion allowing conduction to the second metal foil are provided on outer surfaces of the packaging member.

[2] The power storage device as recited in the aforementioned Item [1], wherein
the first metal foil and the positive electrode current collector are made of the same kind of metal, and
the second metal foil and the negative electrode current collector are made of the same kind of metal.

[3] The power storage device as recited in the aforementioned Item [2], wherein
the first metal foil and the positive electrode current collector are made of aluminum or an aluminum alloy, and
the second metal foil and the negative electrode current collector are made of copper or a copper alloy.

Effects of the Invention

In the power storage device described in the aforementioned Item [1], exchange of electricity is performed via the first metal foil and the second metal foil of the first packaging material and the second packaging material constituting the packaging member. This eliminates tab leads for the exchange of electricity and the first heat fusible resin layer and the second heat fusible resin layer are directly bonded at the entire circumference. Therefore, the heat-sealed portion is superior in sealing property. Furthermore, since at least one of a pair of the first metal foil and the positive electrode current collector and a pair of the second metal foil and the negative electrode current collector is made of the same kind of metal, the electrode potential difference therebetween is small and therefore the increase in internal resistance can be suppressed.

In the power storage device described in the aforementioned Item [2], since the first metal foil and the positive electrode current collector are made of the same kind of metal and the second metal foil and the negative electrode current collector are made of the same kind of metal, the electrode potential difference between the metal foil and the current collector of the packaging member at both electrodes is small and therefore an increase in internal resistance can be suppressed.

In the power storage device described in the aforementioned Item [3], since the first metal foil and the positive electrode current collector are made of aluminum or an aluminum alloy and the second metal foil and the negative electrode current collector are made of copper or a copper alloy, the effect of especially suppressing an increase in internal resistance is great.

EMBODIMENTS FOR CARRYING OUT THE INVENTION

Figure 1:
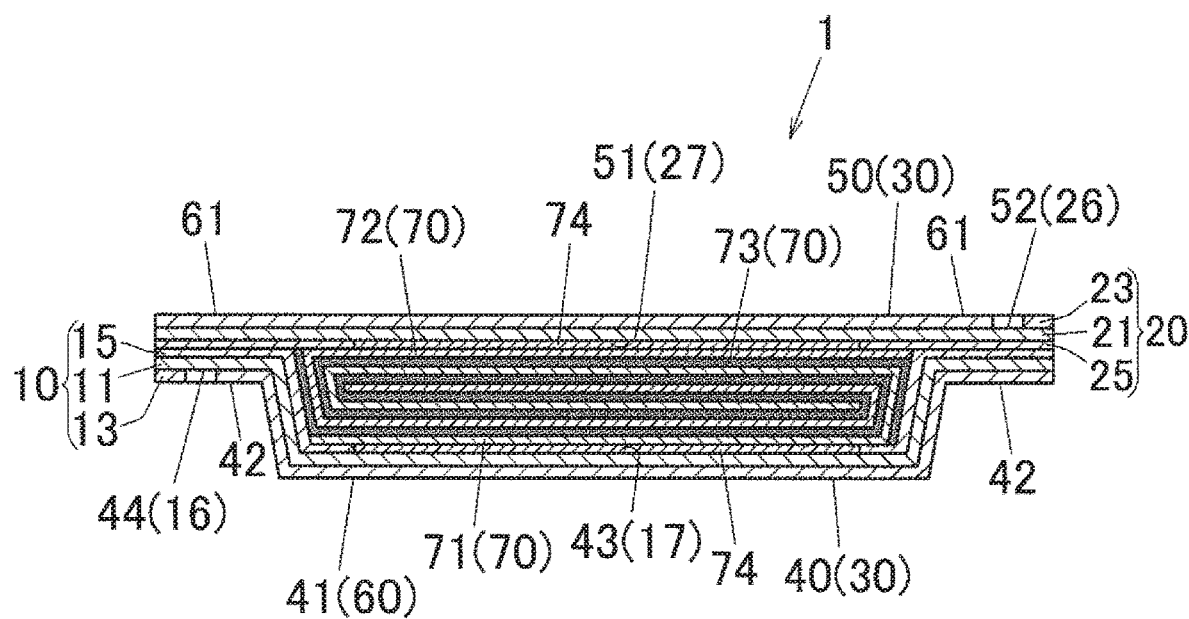
FIG. 1 is a cross-sectional view of one embodiment of a power storage device according to the present invention.
Figure 2:
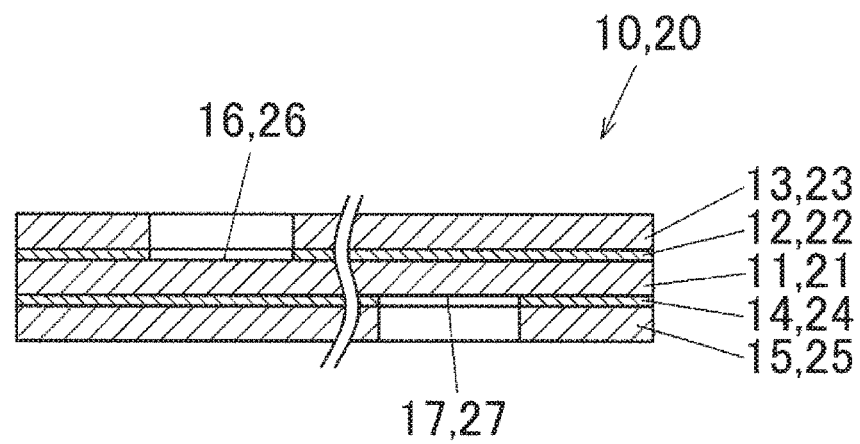
FIG. 2 is a cross-sectional view of a first packaging material and a second packaging material configuring a packaging member of the power storage device shown in FIG. 1.

FIG. 1 shows an embodiment of a power storage device according to the present invention, and FIG. 2 shows a structure of a packaging material constituting a packaging member of the power storage device.

In the following description, it should be noted that members denoted by the same reference numerals indicate the same or equivalent members, and redundant explanations thereof are omitted.

[First Packaging Material and Second Packaging Material]

FIG. 2 shows a lamination structure of a first packaging material 10 and a second packaging material 20 constituting the packaging member 30 of the power storage device 1 shown in FIG. 1 and a formation example of a conducting portion.

In the first packaging material 10, a first heat resistant resin layer 13 is adhered to one surface of a first metal foil 11 by an adhesive layer 12, and a first heat fusible resin layer 15 is adhered to the other surface by an adhesive layer 14. On the surface of the heat resistant resin layer 13 side, a conducting portion 16 is formed. The conducting portion 16 is not provided with the first heat resistant resin layer 13 and the adhesive layer 12, so that the first metal foil 11 is exposed to allow conduction to the first metal foil 11. On the surface of the first heat fusible resin layer 15 side, a conducting portion 17 is formed. The conducting portion is not provided with the first heat fusible resin layer 15 and the adhesive layer 14 and the first metal foil 11 is exposed therethrough. In the packaging member, there exists at least one conducting portion 17 on the first heat fusible resin layer 15 side irrespective of the configuration of the packaging member, and the conducting portion 17 is served as a first inner conducting portion facing the inside of an electrode body chamber. In the case in which the first heat fusible resin layer 15 is served as a part of the outer surface of the packaging member, in some cases, a first outer conducting portion is provided on the surface of the first heat fusible resin layer 15 side. On the other hand, as to the conducting portion 16 on the first heat resistant resin layer 13 side, there are a case in which the conducting portion exists and a case in which no conducting portion exists depending on the configuration of the packaging member. In the case in which the conducting portion exists, the conducing portion is formed on the outer surface of the packaging member and is served as a first outer conducting portion.

In the same manner, in the second packaging material 20, a second heat resistant resin layer 23 is adhered to one surface of a second metal foil 21 by an adhesive layer 22, and a second heat fusible resin layer 25 is adhered to the other surface by an adhesive layer 24. On the surface of the heat resistant resin layer 23 side, a conducting portion 26 is formed in which the second heat resistant resin layer 23 and the adhesive layer 22 are not provided and the second metal foil 21 is exposed therethough to allow conduction to the second metal foil 21. On the surface of the second heat fusible resin layer 25 side, a conducting portion 27 is formed in which the second heat fusible resin layer 25 and the adhesive layer 24 are not provided and the second metal foil 21 is exposed therethrough to allow conduction to the second metal foil 21. In the packaging member, there exists at least one conducting portion 27 on the second heat fusible resin layer 25 side irrespective of the configuration of the packaging member, and the conducting portion 27 is served as a second inner conducting portion facing the inside of the electrode body chamber. In the case in which the second heat fusible resin layer 25 is served as a part of the outer surface of the packaging member, in some cases, a second outer conducting portion is provided on the surface of the second heat fusible resin layer 25 side. On the other hand, as to the conducting portion 26 on the second heat resistant resin layer 23 side, there are a case in which the conducting portion exists and a case in which no conducting portion exists depending on the configuration of the packaging member. In the case in which the conducting portion exists, the conducing portion is formed on the outer surface of the packaging member and is served as a second outer conducting portion.

In the present invention, it should be noted that it is a requirement that the conducting portions 16, 17, 26, and 27 allow conduction to the first metal foil 11 or the second metal foil 21, and it is not a requirement that the first metal foil 11 or the second metal foil 21 are exposed. For example, in the case in which the adhesive layers 12, 14, 22, and 24 are formed of a conductive adhesive agent, even if the adhesive layers 12, 14, 22, and 24 on the first metal foil 11 or the second metal foil 21 are exposed, a conducting portion can be served. The conducting portions 16 and 17 can be each formed into an arbitrary shape at an arbitrary position of the first packaging material 10. The same is applies to the conducting portions 26 and 27 of the second packaging material 20.

The conducting portion can be formed by the following methods. It should be noted that the present invention does not limit a production method of the first packaging material 10 and the second packaging material 20 including the method of forming the conducting portions and that the followings are mere examples of the formation method of the conducting portion.

(1) By a well-known method, a heat resistant resin layer, a metal foil layer, and a heat fusible resin layer are adhered by an adhesive agent, and the resin layers and the adhesive layer are cauterized and removed by laser irradiation.

(2) At the time of applying an adhesive agent to a metal foil, an uncoated area in which an adhesive agent is not applied is formed at a portion where a conducting portion is to be formed, and a heat resistant resin layer or a heat fusible resin layer is adhered. Thereafter, the resin layers on the uncoated portion are removed by cutting.

(3) A masking tape is pasted on a part of a metal foil where a conducting portion is to be formed. In this state, an adhesive agent is applied and a heat resistant resin layer or a heat fusible resin layer is adhered thereto. Thereafter, the resin layer and the adhesive agent are removed together with the masking tape.

[Power Storage Device]

The power storage device 1 shown in FIG. 1 is provided with an electrode body 70 and a packaging member 30 that accommodates and seals the electrode body 70. In FIG. 1, it should be noted that illustrations of the adhesive layers 12, 14, 22, and 24 of the first packaging material 10 and the second packaging material 20 are omitted.

[Packaging Member]

The packaging member 30 is composed of a main body 40 having a recess and a flat lid 50 covering the main body 40.

The main body 40 is composed of the first packaging material 10, and is formed by subjecting the first packaging material 10 of a flat sheet to processing, such as, e.g., stretch forming and drawing, so as to form a recess 41 having a rectangular shape in a plan view and served as an electrode body chamber 60 and a flange 42 extending substantially horizontally and outwardly from the opening edge of the four sides of the recess 41. A first inner conducting portion 43 where the first metal foil 11 is exposed is formed on the inner side of the bottom wall of the recess 41, that is, the surface on the first heat fusible resin layer 15 side. Further, a first outer conducting portion 44 through which the first metal foil 11 is exposed is formed on the outer surface of one of the four side flanges 42, that is, the surface of the first heat resistant resin 13 side.

The lid 50 is composed of the second packaging material 20 having the same dimensions as the planar dimensions of the main body 40, and includes a second inner conducting portion 51 through which the second metal foil 21 is exposed. The second inner conducting portion 51 is formed at a position facing the first inner conducting portion 43 in the electrode body chamber 60, that is, on the surface of the second heat fusible resin layer 25 side during the assembly. A second outer conducting portion 52 through which the second metal foil 21 is exposed is provided on the surface of the second heat resistant resin layer 23 side which is the outer surface of the lid 50.

[Electrode Body]

The electrode body 70 is composed of a positive electrode 71, a negative electrode 72, and a separator 73.

Figure 3:
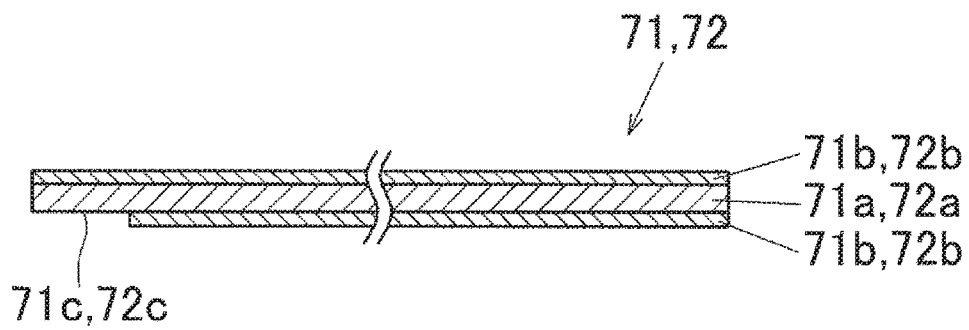
FIG. 3 is a cross-sectional view of a positive electrode and a negative electrode.

As shown in FIG. 3, in the positive electrode 71, a positive electrode active material portion 71b formed by applying a positive electrode active material is formed on both surfaces of a positive electrode current collector 71a made of a metal foil except for one surface of an end portion 71c of the positive electrode current collector 71a. At the end portion 71c, the positive electrode current collector 71a is exposed, and the end portion 71c is served as a connecting portion to the first inner conducting portion 43 of the packaging member 30. In the negative electrode 72, a negative electrode active material portion 72b formed by applying a negative electrode active material is formed on both surfaces of a negative electrode current collector 72a made of a metal foil except for one surface of an end portion 72c of the negative electrode current collector 72a. At the end portion 72c, the negative electrode current collector 72a is exposed, and the end portion 72c is served as a connecting portion to the second inner conducting portion 51 of the packaging member 30. The electrode body 70 is a laminated body assembled by interposing a separator 73 between the positive electrode 71 and the negative electrode 72. The electrode body 70 in FIG. 1 is a laminated wound type electrode body formed by sandwiching a separator 73 between a long positive electrode 71 and a long negative electrode 72 and winding them so that the end portions 71c and 72c become winding ends.

Other than the illustrated wound type electrode body example, the electrode body may be a laminate type in which one or more positive electrodes each cut into a predetermined dimension and one or more negative electrodes each cut into a predetermined dimension are alternately laminated with a separator interposed therebetween. In the case of laminating a plurality of positive electrodes and a plurality of negative electrodes, a plurality of positive electrode current collectors and a plurality of negative electrode current collectors are connected to the plurality of positive electrodes and the plurality of negative electrodes, respectively.

[Assembly]

The end portion 71c (not numbered in FIG. 1) of the positive electrode 71 of the electrode body 70 is connected to the first inner conducting portion 43 of the main body 40 by a conductive binder 74, and the end portion 72c (not numbered in FIG. 1) of the negative electrode 72 is connected to the second inner conducting portion 51 of the lid 50 by a conductive binder 74. An electrolyte is injected therebetween and the periphery of the electrode body chamber 60 is heat-sealed to form a heat-sealed portion 61. In this way, a power storage device 1 in which the electrode body 70 is sealed in the electrode body chamber 60 of the packaging member 30 is produced. In the power storage device 1, the positive electrode 71 of the electrode body 70 sealed in the electrode body chamber 60 of the packaging member 30 is joined to the first inner conducting portion 43 of the first packaging material 10 and conducted to the first metal foil 11, and the negative electrode 72 is joined to the second inner conducting portion 51 of the second packaging material 20 and conducted to the second metal foil 21, so that electricity is exchanged with the outside through the first outer conducting portion 44 and the second outer conducting portion 52 provided on the outer surfaces of the packaging member 30 through the first metal foil 11 and the second metal foil 21.

(Metal Foil of Packaging Member and Current Collector of Electrode Body)

In the power storage device 1, the first metal foil 11 and the positive electrode current collector 71a are made of the same kind of metal, and the second metal foil 21 and the negative electrode current collector 72a are made of the same kind of metal. In the present invention, the same kind of metal denotes a pure metal and an alloy in which the element largest in amount contained therein is the same, and the different kinds of metals denote a pure metal and an alloy in which the element largest in amount contained therein is different. For example, pure aluminum and an aluminum alloy are classified as the same kind of metal, and aluminum alloys different in compositions are also classified as the same kind of metal. On the other hand, an aluminum alloy and a copper alloy are classified as different kinds of metals.

The positive electrode current collector 71a is conducted to the first inner conducting portion 43 of the first metal foil 11, the negative electrode current collector 72a is conducted to the second inner conducting portion 51 of the second metal foil 21, and current flows respectively. Under such circumstances, corrosion is likely to occur as the electrode potential difference between the metal foil of the packaging material and the current collector bonded to the metal foil is large. As shown in Table 1, the standard electrode potential differs depending on the metal element, and when the metal foil of the packaging material and the current collector of the electrode body are made of different kinds of metals, the potential difference is large. In an electrolyte (liquid) environment, there is a risk that a galvanic corrosion occurs due to the electrode potential difference between different kinds of metals and an internal resistance abnormality due to a corrosion reaction occurs at the contact portion thereof. In the present invention, the same kind of metal is used as the material of the metal foil of the packaging member and the current collector of the electrode body to reduce the electrode potential difference so that the corrosion due to the potential difference is suppressed to thereby suppress the increase in the internal resistance. Also, it is preferable that the electrode potential difference between the same kind of metals be as small as possible, and therefore it is more preferable to use the same composition metal or to use the same kind of metal with an electrode potential difference of 0.5 V or less.

TABLE 1

| Metal element | Standard electrode potential (V) |
|---|---|
| Al | −1.676 |
| Ni | −0.257 |
| Fe | −0.440 |
| Cu | 0.340 |
| Ag | 0.799 |
| Pt | 1.188 |
| Au | 1.520 |

In the power storage device of the present invention, it is required that at least one pair of the first metal foil and positive electrode current collector and the second metal foil and the negative electrode current collector be made of the same kind of metal. Furthermore, it is preferable that both pairs be made of the same kind of metal, which can suppress the increase in the internal resistance at both electrodes.

The kind of metal constituting the metal foil of the packaging member and the current collector of the electrode body is not limited as long as it is a metal high in conductivity, but the preferred metal element which is most contained in a metal constituting the first metal foil and the positive electrode current collector is Al, Ni, Fe, Ag, Pt, and Au. The preferred metal element which is most contained in a metal constituting the second metal foil and the negative electrode current collector is Cu, Fe, Ag, Pt, and Au. The thickness of these metal foils is preferably 7 μm to 150 μm. In the case of using an iron alloy foil, a stainless steel foil is preferable.

Further, in the first metal foil of the first packaging material and the second metal foil of the second packaging material, it is also preferable to form a chemical conversion coating as long as it does not affect the conduction between the metal layer of the packaging material and the current collecting portion. The chemical conversion coating is a film formed by subjecting a surface of a metal foil to a chemical conversion treatment. By applying such a chemical conversion treatment, corrosion of the metal foil surface due to an electrolyte can be sufficiently prevented. For example, by performing the following processing, the metal foil is subjected to a chemical conversion treatment. That is, on a surface of a metal foil subjected to a degreasing treatment, after applying any one of the following aqueous solutions 1) to 3) to the surface of the metal foil, drying is carried out to perform a chemical conversion treatment.

1) An aqueous solution of a mixture containing:
phosphoric acid;
chromic acid; and
at least one compound selected from the group consisting of a fluoride metal salt and a fluoride non-metal salt 2) An aqueous solution of a mixture containing:
phosphoric acid;
at least one resin selected from the group consisting of an acryl based resin, a chitosan derivative resin, and a phenol based resin; and
at least one compound selected from the group consisting of chromic acid and a chromium (III) salt 3) An aqueous solution of a mixture containing:
phosphoric acid;
at least one resin selected from the group consisting of an acryl based resin, a chitosan derivative resin, and a phenol based resin;
at least one compound selected from the group consisting of chromic acid and a chromium (III) salt; and
at least one compound selected from the group consisting of a fluoride metal salt and a fluoride non-metal salt.

In the chemical conversion coating, it is preferable that the chromium adhesion amount (per one surface) be 0.1 mg/m$^2$ to 50 mg/m$^2$ since it does not affect the conduction between the metal layer of the packaging material and the current collector and it also preferable as a corrosion countermeasure, and particularly preferably 2 mg/m$^2$ to 20 mg/m$^2$.

[Evaluation of Combination of Metal Foil of Packaging Material and Current Collector of Electrode Body]

Figure 4:
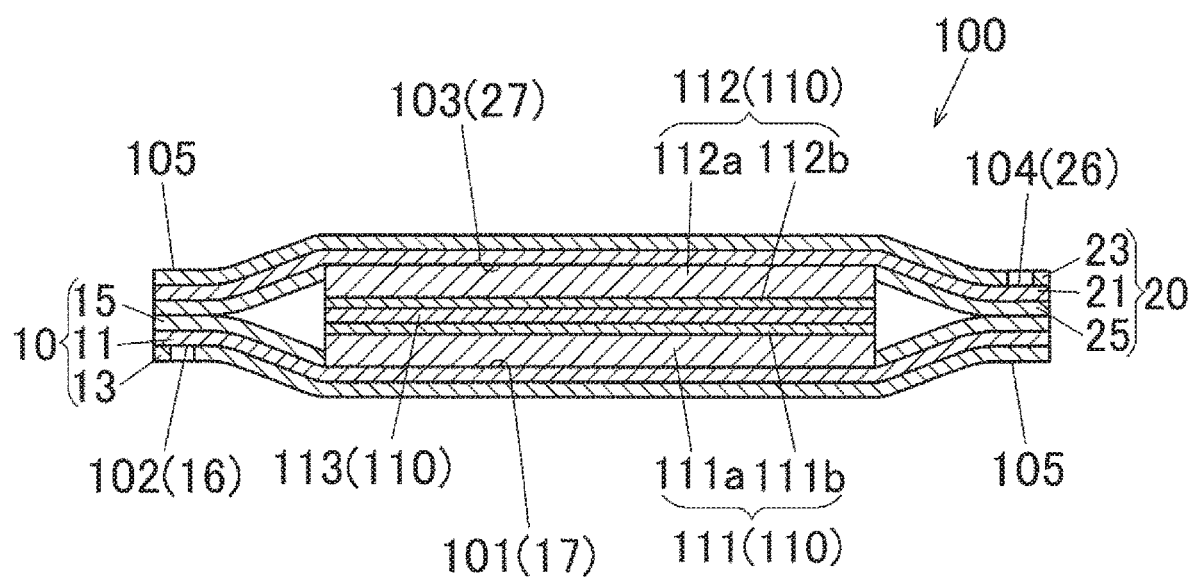
FIG. 4 is a cross-sectional view of a testing power storage device.

Various combinations of testing power storage devices were prepared in which materials of the metal foil of the packaging material and the material of the current collector of the electrode body are changed, and the suitability of the combinations was evaluated. FIG. 4 is a cross-sectional view of a testing power storage device 100, and a plurality of testing power storage devices 100 produced as described below differ from each other in constituent material. In FIG. 4, it should be noted that illustrations of the adhesive layers 12, 14, 22, and 24 are omitted.

(Combination of First Metal Foil and Positive Electrode Current Collector)

Four kinds of first packaging materials 10 were prepared by combining four kinds of first metal foils 11 with common materials including a biaxially stretched polyamide film having a thickness of 25 μm as a first heat resistant resin layer 13, a non-stretched polypropylene film having a thickness of 40 μm as a first heat fusible resin layer 15, a two-part curing type polyester-urethane based adhesive agent (coating thickness of 3 μm) as an adhesive layer 12, and a two-part curing type acid-modified polypropylene adhesive agent (coating thickness of 2 μm) as an adhesive layer 14. The four kinds of first metal foils 11 each had a thickness of 40 μm. As those four kinds of first metal foils 10, a hard aluminum foil (A8079H specified in JIS H4160), a hard copper foil (hard copper foil of C1100R classified by JIS H3100), a stainless steel foil (SUS304), a nickel foil (nickel foil of NB-1 classified in JIS H4551) were used.

Using the materials, four kinds of first packaging materials 10 were produced. The first packaging materials 10 each had an outer shape of 60 mm×45 mm, and included a first inner conducting portion 101 of 40 mm×25 mm on the surface on the first heat fusible resin layer 15 side, and the first outer conducting portion 102 of 10 mm×5 mm on the surface of the first heat resistant resin layer 13 side.

The second packaging material 20 to be combined with the first packaging material 10 was common. A hard copper foil (hard copper foil of C1100R classified by JIS H3100) with a thickness of 15 μm was used as a second metal foil 21. A biaxially stretched polyamide film having a thickness of 25 μm was used as a first heat resistant resin layer 23. A non-stretched polypropylene film having a thickness of 40 μm was used as a second heat fusible resin layer 15. A two-part curing type polyester-urethane based adhesive agent (coating thickness of 3 μm) was used as an adhesive layer 22. A two-part curing type acid-modified polypropylene adhesive agent (coating thickness of 2 μm) was used as an adhesive layer 24.

Using the materials, a second packaging material 20 was produced. The second packaging material 20 had an outer shape of 60 mm×45 mm, and included a second inner conducting portion 103 of 40 mm×25 mm on the surface on the second heat fusible resin layer 25 side, and a second outer conducting portion 104 of 10 mm×5 mm on the surface of the second heat resistant resin layer 23 side.

Two kinds of electrode bodies 110 were prepared in which the positive electrode current collector 111a of the positive electrode 111 was changed. For the positive electrode current collector 111a used, a hard aluminum foil (8079H specified by JIS H4160) and a nickel foil having a thickness of 20 μm (NB-1 specified by JIS H4551) each having a size of 50 mm×35 mm and a thickness of 30 μm were used. On the other hand, the negative electrode current collector 112a was common. As the negative electrode current collector 112a, a hard copper foil (hard copper foil of C1100R classified by JIS H3100) having the same dimensions as the positive electrode current collector 111a and a thickness of 15 μm was used. The positive electrode 111 was produced by forming a positive electrode active material portion 111b having a thickness of 30 μm on one surface of a positive electrode current collector 111a. The positive electrode active material portion 111b was produced by applying a paste in which 60 parts by mass of a positive electrode active material containing a lithium cobalt oxide as a main component, 10 parts by mass of a PVDF as a binder and electrolyte holding agent, 5 parts by mass of an acetylene black (conductive material), and a 25 parts by mass of a N-methyl-2-pyrrolidone (NMP) (organic solvent) were kneaded and dispersed to the surface of the positive electrode current collector 111a, and then dried at 100° C. for 30 minutes, and then hot pressed. The negative electrode 112 was produced by forming a negative electrode active material portion 112b having a thickness of 20 μm on one surface of a negative electrode current collector 112a. The negative electrode active material portion 112b was produced by applying a paste in which 100 parts by mass of a negative electrode active material containing carbon powder as a main component, 5 parts by mass of a PVDF as a binder and electrolyte holding agent, 10 parts by mass of a copolymer of hexafluoropropylene and maleic anhydride, 3 parts by mass of an acetylene black (conductive material), and a 25 parts by mass of a N-methyl-2-pyrrolidone (NMP) (organic solvent) were kneaded and dispersed to the surface of the negative electrode current collector 112a, and then dried at 100° C. for 30 minutes, and then hot pressed. As the separator 113, a propylene film having a thickness of 30 μm was used. As shown in FIG. 4, the electrode body 110 was fabricated by arranging the positive electrode 111 and the negative electrode 112 such that the positive electrode active material portion 111b and the negative electrode active material portion 112b were opposed to each other and interposing a separator 113 therebetween.

Further, as an electrolyte, a solution in which a $LiPF_6$ was added to a mixed carbonate solution in which an ethylene carbonate, a diethyl carbonate, and a dimethyl carbonate were mixed at a volume ratio of 1:1:1 and that the $LiPF_6$ concentration was adjusted to 1 mol/L was used.

The testing power storage device 100 was produced by joining the positive electrode current collector 111a of the electrode body 100 to the first inner conducting portion 101 of the first packaging material 10, joining the negative electrode current collector 112a to the second inner conducting portion 103 of the second packaging material 20, injecting 1 mL of the electrolyte, and heat-sealing the periphery of the testing electrode body 110 to form a heat-sealed portion 105. As for the testing power storage device 100, eight kinds of testing power storage devices 100 including four different kinds of first packaging materials 10 different in the first metal foil 11 and two different kinds of electrode bodies 110 different in the positive electrode current collectors 111a were prepared.

For the eight kinds of prepared testing power storage devices 100, the impedance at 1 kHz on the positive electrode side was measured with a potentio/galvanostat (manufactured by Biologic, VMP3) having a built-in frequency analyzer. The measurement results are shown in Table 2.

TABLE 2

| | 1 kHz impedance (Ω) | |
| --- | --- | --- |
| First metal foil | Positive electrode current collector Al | Positive electrode current collector Ni |
| Al | 1.3 | 3.7 |
| Cu | 1.5 | 3.3 |
| Stainless steel | 10.5 | 13.0 |
| Ni | 3.7 | 3.1 |

The measurement results described in Table 2 show that the impedance is the lowest when the aluminum first metal foil 11 is combined to the aluminum positive electrode current collector 111a, the impedance is the lowest when the nickel first metal foil 11 is connected to the nickel positive electrode current collector 111a, and the internal resistance can be suppressed by combining the same kind of metals. Furthermore, in the eight kinds of combinations, it is shown that the combination of aluminums has the lowest impedance and the combination of aluminums is preferable on the positive electrode side.

[Combination of Second Metal Foil and Negative Electrode Current Collector]

In the first packaging material 10, a hard aluminum foil having a thickness of 40 μm (A8079H specified by JIS H4160) was used as the first metal foil 11. In the first heat resistant resin layer 13, the first heat fusible resin layer 15, and the adhesive layers 12 and 14, the same materials as those of first packaging material for positive electrode side evaluations were used. With these materials, in the same manner as the first packaging material 10 for positive electrode side evaluations, the first packaging material 10 having the first inner conducting portion 101 and the outer conducting portion 102 was produced.

On the other hand, in the second packaging material 20, four kinds of second packaging materials 20 were prepared in which the second heat resistant resin layer 23, the second heat fusible resin layer 25, and the adhesive layers 22 and 24 for positive electrode side evaluations were used as common materials, and these are combined with four kinds of second metal foils 21. The four kinds of second metal foils 21 each had a thickness of 40 μm. As those four kinds of first metal foils 10, a hard aluminum foil (A8079H specified in JIS H4160), a hard copper foil (hard copper foil of C1100R classified by JIS H3100), a stainless steel foil (SUS304), and a nickel foil (nickel foil of NB-1 classified in JIS H4551) were used. With these materials, in the same manner as the second packaging material 20 for positive electrode side evaluations, the four kinds of second packaging materials 20 each having the second inner conducting portion 103 and the second outer conducting portion 104 were produced.

Two kinds of electrode bodies 110 were prepared in which the negative electrode current collector 112a of the negative electrode 112 was changed. For the negative electrode current collector 112a used, a hard copper foil (hard copper foil of C1100R specified by JIS H3100) having a thickness of 15 μm and a stainless steel foil (SUS304) having a thickness of 20 μm each having a size of 50 mm×35 mm were used. On the other hand, the positive electrode current collector 111a was common. As the positive electrode current collector 111a, a hard aluminum foil (8079H defined by JIS H4160) having the same dimensions as the negative electrode current collector 112a and a thickness of 30 μm was used. The positive electrode 111 was produced by forming a positive electrode active material portion 111b having a thickness of 30 μm on one surface of a positive electrode current collector 111a. The negative electrode 112 was produced by forming a negative electrode active material portion 112b having a thickness of 20 μm on one surface of a negative electrode current collector 112a. The used positive electrode active material, negative electrode active material, and forming method were the same as those of the positive electrode and negative electrode for the positive electrode side testing. As shown in FIG. 4, the electrode body 110 was fabricated by arranging a positive electrode 111 and a negative electrode 112 such that the positive electrode active material portion 111b and the negative electrode active material portion 112b were opposed to each other with a separator 113 interposed therebetween.

The testing power storage device 100 was produced by joining the positive electrode 111 of the testing electrode body 110 to the first inner conducting portion 101 of the first packaging material 10, joining the negative electrode 112 to the second inner conducting portion 103 of the second packaging material 20, injecting 1 mL of an electrolyte, and heat-sealing the periphery of the testing electrode body 110 to form a heat-sealed portion 105. As for the testing power storage device 100, eight kinds of testing power storage devices including four kinds of second packaging materials 20 different in the second metal foil 21 and two kinds of electrode bodies 110 different in the negative electrode current collectors 112a were prepared.

For the eight kinds of prepared testing power storage devices 100, the impedance at 1 kHz on the negative electrode side was measured with a potentio/galvanostat (manufactured by Biologic, VMP3) having a built-in frequency analyzer. The results are shown in Table 3.

TABLE 3

| | 1 kHz impedance (Ω) | |
| --- | --- | --- |
| Second metal foil | Negative electrode current collector Cu | Negative electrode current collector Stainless steel |
| Al | 0.8 | 10.5 |
| Cu | 1.4 | 10.3 |
| Stainless steel | 10.3 | 10.0 |
| Ni | 3.3 | 13.0 |

The measurement results described in Table 3 show that the impedance is the lowest when the copper second metal foil 21 is combined with the copper negative electrode current collector 112a, the impedance is the lowest when the Fe second metal foil 21 is combined with the Fe negative electrode current collector 112a, and the internal resistance is suppressed by combining the same kind of metal. Furthermore, in the eight kinds of combinations, it is shown that the combination of coppers has the lowest impedance and the combination of coppers is preferable on the negative electrode side.

In the power storage device of the present invention, electric power can be exchanged without using a tab lead, and in the heat-sealed portion, the first heat fusible resin layer and the second heat fusible resin layer are directly joined along the entire periphery thereof and therefore it is high in the sealing property.

The power storage device of the present invention is not limited that an outside conducting portion is provided on the heat resistant resin layer side like the power storage device 1. By changing the packaging member such that a part of the heat fusible resin layer becomes an outer surface, it is possible to form an outside conducting portion on the surface of the heat fusible resin layer side. For example, when the first packaging material and the second packaging material are overlapped so that their end portions are arranged in a misaligned manner, a heat fusible resin layer appears on the outer surface of the packaging member. Further, the heat fusible resin layer also appears on the outer surface of the packaging member by folding the end portion of the first packaging material or the second packaging material. Thus, a first outer conducting portion or a second outer conducting portion can be provided at a place where the heat fusible resin layer appears on the outer surface of the packaging member. Also, it is not limited that the packaging member has a recess formed by plastic working.

[Constituent Materials of First Packaging Material, Second Packaging Material and Power Storage Device]

Although the present invention does not limit the materials of the first packaging material, the second packaging material, and the power storage device, the following materials can be exemplified as preferable materials of the constituent members except for the metal foil of the packaging material and the current collector of the electrode body.

[Heat Resistant Resin Layer]

As the heat resistant resins constituting the first heat resistant resin layer 13 and the second heat resistant resin layer 23, a heat resistant resin which does not melt at the heat sealing temperature at the time of heat sealing is used. As the heat resistant resin, it is preferable to use a heat resistant resin having a melting point higher than the melting point of the heat fusible resins constituting the first heat fusible resin layer 15 and the second heat fusible resin layer 25 by 10° C. or more, and it is particularly preferable to use a heat resistant resin having a melting point higher than the melting point of the heat fusible resin by 20° C. or more. For example, it is preferable to use a stretched polyamide film (such as a stretched nylon film, etc.) or a stretched polyester film. Among them, it is particularly preferable to use of a biaxially stretched polyamide film (biaxially stretched nylon film, etc.), a biaxially stretched polybutylene terephthalate (PBT) film, a biaxially stretched polyethylene terephthalate (PET) film, or a biaxially stretched polyethylene naphthalate (PEN) film. It should be noted that the first heat resistant resin layer 13 and the second heat resistant resin layer 23 may be made of a single layer or may be made of a multiple layer (e.g., a multiple layer made of a stretched PET film/a stretched nylon film) made of, for example, a stretched polyester film/a stretched polyamide film. The thickness of the first heat resistant resin layer 13 and that of the second heat resistant resin layer 23 each are preferably 20 μm to 100 μm.

For the adhesive agent constituting the adhesive layer 12 and 22 for bonding the first heat resistant resin layer 13 and the second heat resistant resin layer 23, it is preferable to use at least one kind of adhesive agent selected from the group consisting of a polyester urethane based adhesive agent and a polyether urethane based adhesive agent. The thickness of the second adhesive layer 12, 22 is preferably set to 0.5 μm to 5 μm.

[Heat Fusible Resin Layer]

The heat fusible resin constituting the first heat fusible resin layer 15 and the second heat fusible resin layer 25 is preferably composed of an unstretched film made of at least one heat fusible resin selected from the group consisting of polyethylene, polypropylene, an olefin based copolymer, and an acid modified product and ionomer thereof. The thickness of the heat fusible resin layer 15 and 25 is preferably set to 20 μm to 150 μm.

Further, the adhesive agent constituting the adhesive layer 14 and 24 for bonding the first heat fusible resin layer 15 and the second heat fusible resin layer 25 is preferably a layer formed of an olefin based adhesive agent. In the case of using a two-part curing type olefin based adhesive agent, it is possible to sufficiently prevent deterioration of adhesiveness due to swelling by an electrolyte. The thickness of the adhesive layer 14 and 24 is preferably set to 0.5 μm to 5 μm.

(Electrode Body)

The positive electrode active material portion 71b and 111b is formed of a mixed composition, etc., in which a binder and a positive electrode active material are added. The binder includes, for example, PVDF (polyvinylidene fluoride), a copolymer with a monomer having, vinylidene fluoride and a hydroxyl group, a carboxyl group, a carbonyl group, an epoxy group or the like, PTFE (polytetrafluoroethylene), SBR (styrene butadiene rubber), copolymer of styrene and acrylic acid, CMC (carboxymethylcellulose sodium salt, etc.), PAN (polyacrylonitrile), etc. The positive electrode active material includes, for example, a metal oxide having a layered rock salt type crystal structure containing lithium and further containing at least one metal selected from cobalt, nickel, manganese, and aluminum, a metal oxide having an olivine type crystal structure containing lithium and further containing at least one metal selected from iron and manganese, or a metal oxide having a spinel type crystal structure containing lithium and further containing at least one metal selected from manganese and nickel. The thickness of the positive electrode active material portion 71b, 111b is preferably set to 2 μm to 300 μm. Further, the positive electrode active material portions 71b and 111b may contain a conductivity enhancer, such as, e.g., a carbon black such as acetylene black, furnace black, and ketjenblack, graphite fine particles, and CNT (carbon nanotube).

The negative electrode active material portion 72b and 112b is formed of a mixed composition, etc., in which, for example, a negative electrode active material is added to a binder. The binder is exemplified by PVDR, a copolymer with a monomer having vinylidene fluoride and a hydroxyl group, a carboxyl group, a carbonyl group, an epoxy group, etc., SBR, a copolymer of styrene, and acrylic acid, CMC, and PAN. The negative electrode active material is exemplified by a metal including graphite, easily graphitizable carbon, non-graphitizable carbon, lithium titanate, silicon, elements alloyable with lithium such as tin. The thickness of the negative electrode active material portion 72b and 112b is preferably set to 1 μm to 300 μm. Further, the negative electrode active material portions 72b and 112b may contain a conductivity enhancer, such as, e.g., carbon black such as acetylene black, furnace black, and ketjenblack, graphite fine particles, CNT (carbon nanotube), and graphite fine particles.

The separators 73 and 113 may be exemplified by a polyethylene separator, a polypropylene separator, a separator formed of a multilayer film composed of a polyethylene film and a polypropylene film, and a separator composed of a wet or dry porous film coated with a heat resistant inorganic material such as ceramics on the resin separator of the multilayer film. The thickness of the separator 73 and 113 is preferably set to 5 μm to 50 μm.

For the purpose of reducing the contact resistance between the current collector and the active material portion, an undercoat layer may be provided between the current collector and the active material portion. The composition of the undercoat layer is not particularly limited, but, for example, in order to improve the conductivity of a binder made of PVDF (polyvinylidene fluoride), SBR (styrene butadiene rubber), PAN (polyacrylonitrile), polysaccharides such as chitosan, polysaccharide derivatives of CMC (carboxymethylcellulose sodium salt, etc.), etc., a composition in which a conductivity enhancer, such as, e.g., carbon black and CNT (carbon nanotube), is added is preferably used. In the case of arranging the undercoat layer, the thickness is preferably set to 0.01 μm to 10 μm.

[Electrolyte]

For the electrolyte, it is preferable to use an electrolyte in which a salt selected from lithium salts including lithium hexafluorophosphate, lithium bis-trifluoromethanesulfonylimide, lithium bis-fluorosulfonylimidem is dissolved in an organic solvent alone or in a mixture of ethylene carbonate, propylene carbonate, dimethyl carbonate, diethyl carbonate, methyl ethyl carbonate, acetonitrile, γ Butyrolactone, etc.

The present application claims priority to Japanese Patent Application No. 2015-196965 filed on Oct. 2, 2015, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The power storage device of the present invention is utilized as a lithium ion battery, an electric double layer capacitor, an all solid battery or the like.

DESCRIPTION OF REFERENCE SYMBOLS

1: power storage device
10: first packaging material
11: first metal foil
13: first heat resistant resin layer
15: first heat fusible resin layer
16, 17: conducting portion
20: second packaging material
21: second metal foil
23: second heat resistant resin layer
25: second heat fusible resin layer
26, 27: conducting portion
30: packaging member
40: main body (first packaging material)
43, 101: first inner conducting portion
44, 102: first outer conducting portion
50: lid (second packaging material)
51, 103: second inner conducting portion
52, 104: second outer conducting portion
60: electrode body chamber
61, 105: heat-sealed portion
70, 110: electrode body
71, 111: positive electrode
71a, 111a: positive electrode current collector
71b, 111b: positive electrode active material portion
72, 112: negative electrode
72a, 112a: negative electrode current collector
72b, 112b: negative electrode active material portion
73, 113: separator
100: testing power storage device

The invention claimed is:

1. A power storage device comprising:
a first packaging material in which a first heat resistant resin layer is adhered to one surface of a first metal foil and a first heat fusible resin layer is adhered to the other surface of the first metal foil, wherein the first packaging material is provided with a first inner conducting portion allowing conduction to the first metal foil on a surface of the first heat fusible resin layer side;
a second packaging material in which a second heat resistant resin layer is adhered to one surface of a second metal foil and a second heat fusible resin layer is adhered to the other surface of the second metal foil, wherein the second packaging material is provided with a second inner conducting portion allowing conduction to the second metal foil on a surface of the second heat fusible resin layer side, and
an electrode body including a positive electrode in which a positive electrode active material is coated on a positive electrode current collector, a negative electrode in which a negative electrode active material is coated on a negative electrode current collector, and a separator disposed between the positive electrode and the negative electrode, wherein
the first packaging material is provided with a recess and a flange extending outwardly from an opening edge of the recess, a first outer conducting portion allowing conduction to the first metal foil is formed on a surface of the flange on the first heat resistant resin layer side, and a second outer conducting portion allowing conduction to the second metal foil is formed on a surface of a peripheral edge portion of the second outer packaging material,
a packaging member having an electrode body chamber in which the first inner conducting portion and the second inner conducting portion face in the chamber is formed such that the first heat fusible resin layer of the first packaging material and the second heat fusible resin layer of the second packaging material face each other and the chamber is surrounded by a heat-sealed portion in which the first heat fusible resin layer of the flange of the first packaging material and the second heat fusible resin layer of the peripheral edge portion of the second packaging material are fusion-bonded,
the positive electrode of the electrode body sealed in the electrode body chamber together with an electrolyte is conducted to the first inner conducting portion, and the negative electrode thereof is conducted to the second inner conducting portion, and
at least one of a pair of the first metal foil and the positive electrode current collector and a pair of the second metal foil and the negative electrode current collector is made of the same kind of metal.

2. The power storage device as recited in claim 1, wherein the first metal foil and the positive electrode current collector are made of the same kind of metal, and the second metal foil and the negative electrode current collector are made of the same kind of metal.

3. The power storage device as recited in claim 2, wherein the first metal foil and the positive electrode current collector are made of aluminum or an aluminum alloy, and the second metal foil and the negative electrode current collector are made of copper or a copper alloy.

4. The power storage device as recited in claim 1, wherein the positive electrode current collector conducts to the first inner conducting portion and the negative electrode current collector conducts to the second inner conducting portion.

5. The power storage device as recited in claim 1, wherein the positive electrode includes an end portion to expose a part of the positive electrode current collector.

6. The power storage device as recited in claim 5, wherein the end portion is a connecting portion to the first inner conducting portion of the first packaging material.

7. The power storage device as recited in claim 1, wherein the negative electrode includes an end portion to expose a part of the negative electrode current collector.

8. The power storage device as recited in claim 7, wherein the end portion is a connecting portion to the second inner conducting portion of the second packaging material.

* * * * *